No. 725,582. PATENTED APR. 14, 1903.
R. L. NEVILLE.
MOWING MACHINE.
APPLICATION FILED MAY 1, 1901.
NO MODEL.
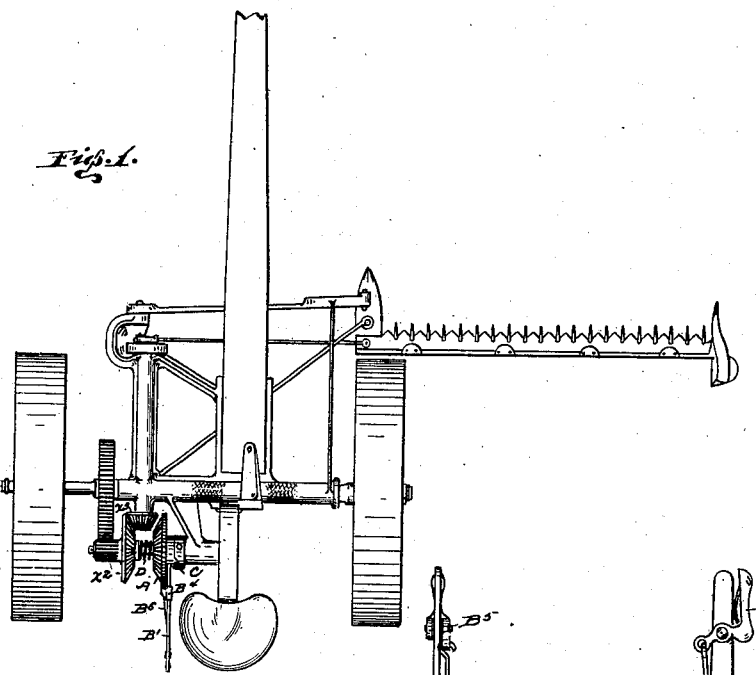
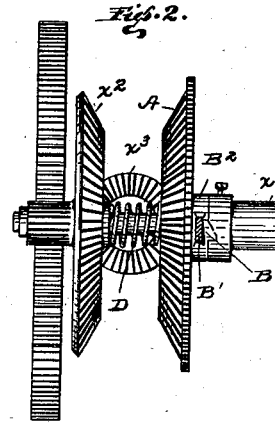
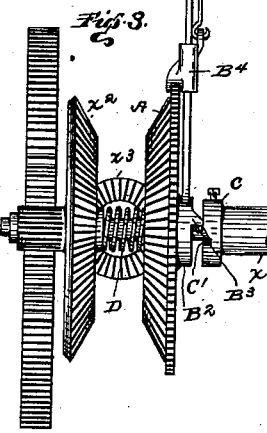
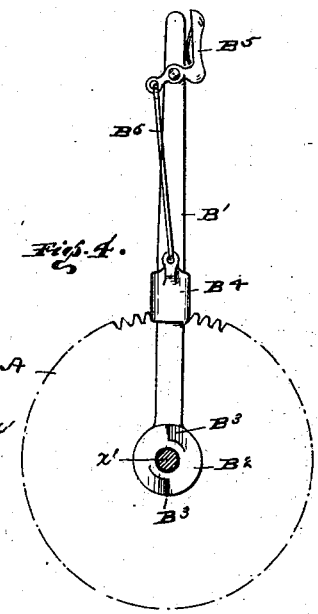
WITNESSES:
INVENTOR.
Robert L. Neville.
BY
E. F. Murdock & Co.
ATTORNEYS.

UNITED STATES PATENT OFFICE.

ROBERT L. NEVILLE, OF SAN FRANCISCO, CALIFORNIA.

MOWING-MACHINE.

SPECIFICATION forming part of Letters Patent No. 725,582, dated April 14, 1903.

Application filed May 1, 1901. Serial No. 58,384. (No model.)

*To all whom it may concern:*

Be it known that I, ROBERT L. NEVILLE, a citizen of the United States, residing at 3214 Washington street, in the city and county of San Francisco and State of California, have invented certain new and useful Improvements in Mowing-Machines; and I do hereby declare the following to be a full, clear, and exact description of said invention, such as will enable others skilled in the art to which it most nearly appertains to make, use, and practice the same.

This invention relates to improvements in agricultural implements, and particularly to mowing-machines.

All types of mowing-machines are subject to this disadvantage: Owing to the lost motion in the driving-gear between the main shaft and the reciprocating knife-sections the knife-sections do not begin immediately to reciprocate when the machine is started up, resulting in a bunch of stalks jamming between the fingers of the finger-bar. By the time the lost motion is taken up in the gearing the accumulation of stalks is too great to be cut by the knife-section, owing to the fact that the pitman is usually jammed on a dead-center and cannot get sufficient play to force the knife-sections forward. This necessitates pulling the accumulation out by hand, a very dangerous as well as often impossible or futile remedy. By the time the accumulation has been removed the gearing has returned to the orignal condition of lost motion.

The object of this invention is to provide a means whereby the lost motion before mentioned can be taken up before the machine is started, so that immediately a start is made the knife-sections simultaneously begin reciprocating, cutting the stalks as fast as the cutter-bar advances, thus avoiding a jam between the fingers of the cutter-bar, and, further, providing means whereby the knife-sections may be reciprocated by the operator independent of the traction-wheels of the mower, so that in the event of an accumulation at the point before mentioned the cutter-bar could be cleaned without endangering the fingers of the operator.

The invention consists in the mechanism and novel arrangement of the parts which are more fully set forth in the specification and recited in the appended claims.

In the drawings, Figure 1 is a plan view from above of a mower having this attachment thereon. Fig. 2 is a rear elevation of the invention and the portion of the gearing immediately affected thereby, showing the idler out of engagement. Fig. 3 is a similar view showing the idler in engagement. Fig. 4 is a side elevation of the idler and lever for operating same.

In construction the invention consists of the idler A, loosely mounted upon the counter-shaft $x'$ of the machine, the lever B', having head $B^2$, with clutch-teeth $B^3$ thereon, the latch-guide $B^4$, engaging the toothed periphery of the wheel A, the handpiece $B^5$, pivoted near the handle of the lever, the rod $B^6$ between the latch-guide $B^4$ and handpiece $B^5$, the clutch-collar C, having recesses C' for the clutch-teeth $B^3$, and the spiral spring D between the idler A' and gear-wheel $X^2$.

In operation before the mower is started the idler A is thrown into engagement with pinion $X^3$ by pushing the lever B' forward, unseating the teeth $B^3$, which by reason of their shape throw the idler into engagement with the pinion $X^3$. The handpiece $B^5$ is now grasped, which throws the latch-guide $B^4$ into engagement with the toothed periphery of the idler A. The partial rotation forward of the idler A takes up all the lost motion both forward and back of the pinion $X^3$, so that immediately the traction-wheels start forward the cutter-section simultaneously begins reciprocating.

It is obvious that the rotation of the idler A is but a small segment of a circle in taking up the lost motion.

The crown of the clutch-teeth $B^3$, bearing against the collar C, is free to operate between the recesses C' and still maintain the engagement between the idler A and pinion $X^3$.

In the event of an accumulation between the fingers of the finger-bar too great to be cut by the ordinary operation of the reciprocating mechanisms the resistance can be invariably overcome by jerking the lever A back and forth, forcing the knife-section through the obstruction.

When the lever is revolved until the teeth $B^3$ and recesses $C'$ are coincident, the idler is forced out of engagement by the expansion of the spring D, which holds the parts in inoperative position.

The collar C is adjustably attached to the bracket-bearing $X^4$ by a set-screw, so that it may be adjusted to leave the lever at any desired angle when not in use or may be cast integrally with the bracket-bearing.

Having thus described this invention, what is claimed, and desired to be secured by Letters Patent, is—

1. In a mowing-machine, the combination with the power-shaft for operating the cutter-bar and the pinion on said shaft, of an idler-gear so arranged that it can mesh with said pinion, a lever for holding said idler-gear in mesh with said pinion, and a hand-operated catch on said lever for locking said lever to the idler-gear so that it may be turned thereby.

2. In a mowing-machine, the combination with the power-shaft for operating the cutter-bar, and the pinion on said shaft, of an idler-gear adapted for meshing with the pinion, a spring for holding the idler-gear normally out of mesh with the pinion, and an independent lever adapted for throwing the idler-gear into mesh with the pinion and having means for engaging the idler-gear and turning it.

3. In a mowing-machine, the combination with the power-shaft for operating the cutter-bar, and the pinion on said shaft, of an idler-gear adapted for meshing with the pinion, a spring for holding the idler-gear normally out of mesh with the pinion, an independent lever adapted for throwing the idler-gear into mesh with the pinion, a collar having recesses or pockets, a head on the lever having teeth adapted to enter the pockets when the idler-gear is out of mesh with the pinion and to wipe against the face of the collar when the lever is turned, and releasable latching mechanism for connecting the lever to the idler-gear.

In testimony whereof I have hereunto set my hand this 1st day of April, 1901.

ROBERT L. NEVILLE.

Witnesses:
BALDWIN VALE,
GEORGE F. HATTON.